(12) United States Patent
Lee et al.

(10) Patent No.: US 10,691,335 B2
(45) Date of Patent: Jun. 23, 2020

(54) ELECTRONIC DEVICE AND METHOD FOR PROCESSING INPUT ON VIEW LAYERS

(71) Applicant: Samsung Electronics Co., Ltd., Gyeonggi-do (KR)

(72) Inventors: Sungjun Lee, Gyeonggi-do (KR); Seungjin Kim, Gyeonggi-do (KR); Heesoo Son, Seoul (KR); Jaemin Lee, Gyeonggi-do (KR); Minjung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 100 days.

(21) Appl. No.: 15/418,087

(22) Filed: Jan. 27, 2017

(65) Prior Publication Data

US 2017/0212677 A1    Jul. 27, 2017

(30) Foreign Application Priority Data

Jan. 27, 2016 (KR) .................. 10-2016-0010142

(51) Int. Cl.
*G06F 3/0488* (2013.01)
*G06F 9/451* (2018.01)
(Continued)

(52) U.S. Cl.
CPC ........ *G06F 3/04886* (2013.01); *G06F 3/0418* (2013.01); *G06F 3/0481* (2013.01);
(Continued)

(58) Field of Classification Search
None
See application file for complete search history.

(56) References Cited

U.S. PATENT DOCUMENTS 6,211,879 B1 * 4/2001 Soohoo ................ G06F 3/0481
715/785
2012/0038572 A1   2/2012 Kim et al.
(Continued)

FOREIGN PATENT DOCUMENTS

EP          2 717 146      4/2014
KR     1020120015968      2/2012

OTHER PUBLICATIONS

Title: "How can I open two half-screen windows in a row without overlapping?", Publication Date: May 9, 2011. Publisher: Ask Ubuntu. URL: https://askubuntu.com/guestions/41556/how-can-i-open-two-half-screen-windows-in-a-row-without-overlapping.*

(Continued)

*Primary Examiner* — Abdullah Al Kawsar
*Assistant Examiner* — David V Luu
(74) *Attorney, Agent, or Firm* — The Farrell Law Firm, P.C.

(57) ABSTRACT

An electronic device and method are provided for processing an input using view layers. The electronic device includes a memory, a display, and a processor. The memory stores a first predetermined condition and a second predetermined condition both of which are used for determining whether an input for one or more displayed view objects is valid. The processor displays the view objects using a first view layer and a second view layer at least partially overlapping with the first view layer, and obtains a user input regarding the displayed view object. If a movement of the user input satisfies the first predetermined condition, the processor processes the user input by using the first view layer. If the movement of the user input satisfies the second predetermined condition, the processor processes the user input by using the second view layer.

20 Claims, 10 Drawing Sheets

(51) Int. Cl.
*G06F 3/0482* (2013.01)
*G06F 3/0485* (2013.01)
*G06F 3/041* (2006.01)
*G06F 3/0481* (2013.01)

(52) U.S. Cl.
CPC .......... *G06F 3/0482* (2013.01); *G06F 3/0485* (2013.01); *G06F 3/04883* (2013.01); *G06F 9/451* (2018.02)

(56) References Cited

U.S. PATENT DOCUMENTS

| | | | |
|---|---|---|---|
| 2012/0166975 A1* | 6/2012 | Oh ........................ | G06F 3/0482 715/760 |
| 2015/0033181 A1* | 1/2015 | Mizunuma .............. | G06F 1/169 715/784 |
| 2015/0143273 A1* | 5/2015 | Bernstein .............. | G06F 3/0488 715/767 |

OTHER PUBLICATIONS

European Search Report dated Jun. 9, 2017 issued in counterpart application No. 17151973.9-1972, 8 pages.

* cited by examiner

FIG. 5B

| Move AXIS | VIEW GROUP NAME | TOUCH SLOP BASIS |
|---|---|---|
| X-AXIS | SCROLLVIEW, HORIZONTALSCROLLVIEW, ETC. | MOVE MTOUCHSLOP |
| Y-AXIS | LISTVIEW, GRIDVIEW, EXPANDABLELISTVIEW, ETC. | MOVE MTOUCHSLOP |
| BOTH AXES | REMAINING VIEW GROUPS | MTOUCHSLOP |

ELECTRONIC DEVICE AND METHOD FOR PROCESSING INPUT ON VIEW LAYERS

PRIORITY

This application claims priority under 35 U.S.C. § 119(a) to Korean Patent Application Serial No. 10-2016-0010142 which was filed on Jan. 27, 2016 in the Korean Intellectual Property Office, the entire disclosure of which is incorporated herein by reference.

BACKGROUND

1. Field of the Disclosure

The present disclosure generally relates to an electronic device and method and more particularly to a method of processing an input on a touch-sensitive display of an electronic device.

2. Description of the Related Art

An electronic device, such as a smart phone, having a touch-sensitive display offers a variety of functions. In particular, the electronic device may control such functions by obtaining a user input, e.g., a touch event, through the display.

Using at least one view layer, the electronic device may display a view object, such as content, on the display. In response to a user input, such as a touch event, obtained through the display and associated with the view object, the electronic device may control a particular function associated with the view object.

The electronic device may display at least one view layer through the display, and the view layer may include at least one view object. The electronic device may receive a user input regarding each view object contained in the view layer(s) displayed on the display. The view object may be represented on a certain region of the display so as to receive a user input. Based on the received user input, the electronic device may perform a particular function on a specific view layer corresponding to the user input.

In the electronic device, respective view layers may process different user inputs. For example, there may be a view layer capable of processing a user input in the X-axis direction, and there may be another view layer capable of processing a user input in the Y-axis direction. Also, there may be a view layer capable of processing a user input in both the X-axis direction and the Y-axis direction. When processing a user input on a user interface (UI) formed of such view layers, the electronic device may process the user input differently from the user's intention. For example, when the user swipes with the intention of scrolling or flicking, the electronic device may be silent in response to this input. When the user enters a user input in the Y-axis direction, the electronic device may operate incorrectly by recognizing the user input in the X-axis direction or as a touch input. As such, the electronic device may fail to perform a desired function in response to a user input.

SUMMARY

According to an aspect of the present disclosure, conditions for view layers displayed on a display are predefined, and based on a certain user input which satisfies the predefined conditions, a particular function corresponding to the user input may be performed on the corresponding view layer which may minimize the occurrence of an incorrect operation in response to a user input and also improve the capability to recognize a user input.

In accordance with an aspect of the present disclosure, an electronic device is provided, which includes a memory configured to store a first predetermined condition and a second predetermined condition, both of which are used for determining whether an input for one or more displayed view objects is valid, a display, and a processor functionally connected with the memory and the display. The processor is configured to display the view objects using a first view layer and a second view layer at least partially overlapped with the first view layer, obtain a user input regarding the displayed view object, if a movement of the user input satisfies the first predetermined condition, process the user input by using the first view layer, and if the movement of the user input satisfies the second predetermined condition, process the user input by using the second view layer.

In accordance with another aspect of the present disclosure, a method for operating an electronic device including a display and a processor functionally connected with the display includes displaying, through the display, at least one view object using a first view layer and a second view layer at least partially overlapped with the first view layer, obtaining a user input regarding the displayed view object, if a movement of the user input satisfies a first predetermined condition to be used for determining whether an input for the displayed view object is valid, process the user input by using the first view layer, and if the movement of the user input satisfies a second predetermined condition to be used for determining whether an input for the displayed view object is valid, process the user input by using the second view layer.

In accordance with another aspect of the present disclosure, view layers may be distinguished using view objects displayed on the screen. For example, such view layers forming a user interface (UI) of the electronic device may be identified individually, and view objects corresponding to each view layer may be displayed separately or in combination. The electronic device may predetermine conditions corresponding to a user input (e.g., a touch event) differently for respective view layers. When any user input is detected, the electronic device may identify a specific view layer corresponding to the user input, based on predetermined conditions, and perform a particular function in response to the user input on the identified view layer.

BRIEF DESCRIPTION OF THE DRAWINGS

The above and other aspects, features, and advantages of the present disclosure will be more apparent from the following detailed description taken in conjunction with the accompanying drawings, in which:

FIG. 5B is a table illustrating data corresponding to view groups, according to an embodiment of the present disclosure;

DETAILED DESCRIPTION

Figure 1:
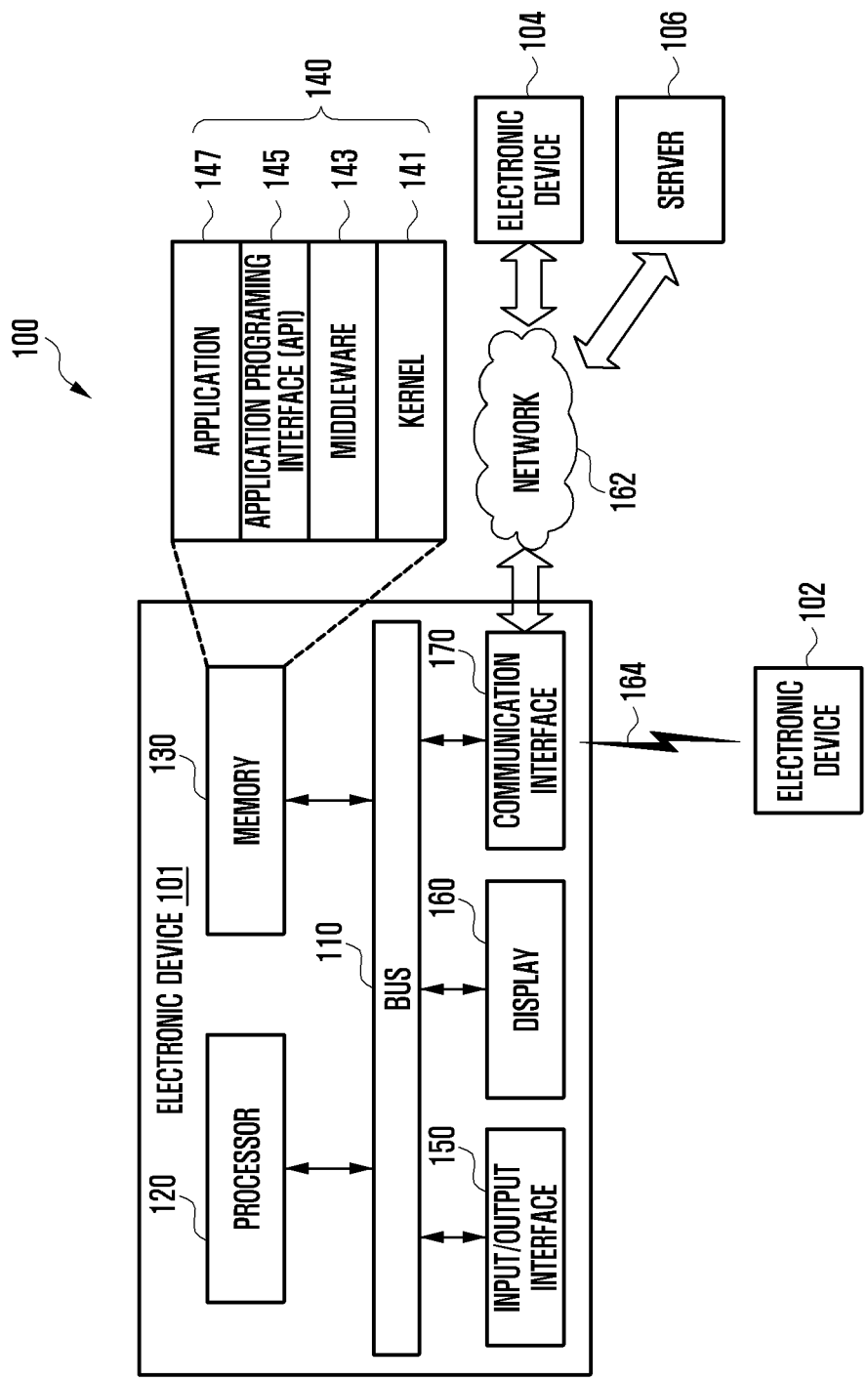
FIG. 1 is a block diagram of a network environment including an electronic device, according to an embodiment of the present disclosure.

Hereinafter, the present disclosure is described with reference to the accompanying drawings. Although specific embodiments are illustrated in the drawings and related detailed descriptions are discussed in the present specification, the present disclosure may have various modifications and several embodiments. However, an embodiment of the present disclosure is not limited to a specific implementation form and it should be understood that the present disclosure includes all changes and/or equivalents and substitutes included in the spirit and scope of an embodiment of the present disclosure. In connection with descriptions of the drawings, similar reference numerals may be used to designate similar elements.

In an embodiment of the present disclosure, terms such as "include", "have", "may include" or "may have" may refer to a certain characteristic, number, step, operation, constituent element, component or a combination thereof, but are not to be construed to exclude the existence of, or a possibility of, the addition of one or more other characteristics, numbers, steps, operations, constituent elements, components or combinations thereof.

In an embodiment of the present disclosure, the expressions "or" or "at least one of A or/and B" include any or all of the combinations of words listed together. For example, the expressions "A or B" or "at least A or/and B" may include A, may include B, or may include both A and B.

The expressions "1", "2", "first", or "second" as used in an embodiment of the present disclosure may modify various components of the various embodiments but do not limit the corresponding components. For example, the above expressions do not limit the sequence and/or importance of the components. The expressions may be used for distinguishing one component from other components. For example, a first user device and a second user device may indicate different user devices although both of them are user devices. For example, without departing from the scope of the present disclosure, a first structural element may be referred to as a second structural element. Similarly, the second structural element also may be referred to as the first structural element.

When it is stated that a component is "operatively or communicatively coupled to" or "connected to" another component, the component may be directly coupled or connected to another component or another component may exist between the component and another component. In contrast, when it is stated that a component is "directly coupled to" or "directly connected to" another component, a third component does not exist between the component and another component. In the present disclosure, the expression "configured (or set) to" may be used to be interchangeably with, for example, "suitable for," "having the capacity to," "designed to," "adapted to," "made to," or "capable of." The expression "configured (or set) to" may not be used to refer to only something in hardware for which it is "specifically designed to." Instead, the expression "a device configured to" may indicate that the device is "capable of" something with other devices or parts. For example, the expression "a processor configured (or set) to perform A, B and C" may refer to a dedicated processor (e.g., an embedded processor) or a general-purpose processor (e.g., CPU or application processor) that may execute one or more software programs stored in a memory device to perform corresponding functions.

An electronic device according to an embodiment of the present disclosure may be a device including an antenna. For example, the electronic device may be one or more of a smart phone, a tablet personal computer (PC), a mobile phone, a video phone, an e-book reader, a desktop PC, a laptop PC, a netbook computer, a personal digital assistant (PDA), portable multimedia player (PMP), an MP3 player, a mobile medical application, a camera, and a wearable device (for example, a head-mounted-device (HMD), such as electronic eyeglasses, electronic clothes, an electronic bracelet, an electronic necklace, an electronic appcessary, an electronic tattoo, and a smart watch).

According to an embodiment of the present disclosure, the electronic device may be a smart home appliance having an antenna. The smart home appliance may include a television (TV), a digital video disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame.

According to an embodiment of the present disclosure, the electronic device may include various types of medical devices (for example, magnetic resonance angiography (MRA), magnetic resonance imaging (MRI), computed tomography (CT), a scanner, an ultrasonic device and the like), a navigation device, a global positioning system (GPS) receiver, an event data recorder (EDR), a flight data recorder (FDR), a vehicle infotainment device, electronic equipment for a ship (for example, a navigation device for ship, a gyro compass and the like), avionics, a security device, a head unit for a vehicle, an industrial or home robot, an automatic teller machine (ATM), and a point of sale (POS) terminal.

According to an embodiment of the present disclosure, the electronic device may include furniture or a part of a building/structure, an electronic board, an electronic signature receiving device, a projector, and various types of measuring devices (for example, a water meter, an electricity meter, a gas meter, a radio wave meter and the like), which are equipped with an antenna. The electronic device may also be a combination of the devices listed above. Further, the electronic device may be a flexible device. It is apparent to those skilled in the art that the electronic device is not limited to the above described devices.

Hereinafter, an electronic device according to an embodiment of the present disclosure will be discussed with reference to the accompanying drawings. The electronic device is not limited to the above embodiments. As used herein, the term "user" may denote a human or another device (e.g., an artificial intelligence electronic device) using the electronic device.

FIG. 1 is a block diagram of a network environment including an electronic device, according to an embodiment of the present disclosure.

FIG. 1 illustrates a network environment 100 including an electronic device 101. The electronic device 101 includes a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include a central processing unit (CPU), an application processor (AP), and a communication processor (CP). The processor 120 is capable of controlling at least one of the other components of the electronic device 101 and/or processing data or operations related to communication.

The memory 130 may include volatile memory and/or non-volatile memory. The memory 130 is capable of storing data or commands related to at least one of other components of the electronic device 101. According to an embodiment of the present disclosure, the memory 130 is capable of storing software and/or a program module 140. For example, the program module 140 includes a kernel 141, middleware 143, application programming interface (API) 145, application programs (or applications) 147, etc. The kernel 141, middleware 143 or at least part of the API 145 may be called an operating system (OS).

The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 may communicate with the kernel 141 and exchange data therewith. The middleware 143 is capable of processing one or more task requests received from the application programs 147 according to a priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. The API 145 may include at least one interface or function (e.g., instructions) for file control, window control, image process, text control, and the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic light emitting diode (OLED) display, micro-electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and a first external device 102, a second electronic device 104, or a server 106. For example, the communication interface 170 is capable of communicating with a second external device 104 or a server 106 connected to the network 162 via wired or wireless communication.

Wireless communication may employ, as a cellular communication protocol, long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 164. Short-wireless communication 164 may include wireless fidelity (WiFi), Bluetooth (BT), near field communication (NFC), magnetic secure transmission (MST), and global navigation satellite system (GNSS). The GNSS may include global positioning system (GPS), global navigation satellite system (Glonass), Beidou navigation satellite system, Galileo, the European global satellite-based navigation system, according to GNSS use areas, bandwidths, etc. In the present disclosure, the terms "GPS" and "GNSS" may be used interchangeably. Wired communication may include universal serial bus (USB), high definition multimedia interface (HDMI), recommended standard 232 (RS-232), and plain old telephone service (POTS). The network 162 may include a telecommunications network, e.g., a computer network (e.g., LAN or WAN), the Internet, and a telephone network.

The first and second external electronic devices 102 and 104 are each identical to or different from the electronic device 101, in terms of type. According to an embodiment of the present disclosure, the server 106 may include a group of one or more servers. Part or all of the operations executed on the electronic device 101 may be executed on another electronic device or electronic devices 102 and 104 or a server 106. When the electronic device needs to perform a function or service automatically or according to a request, it does not perform the function or service, but is capable of additionally requesting at least part of the function related to the function or service from electronic devices 102 and 104 or a server 106. The electronic devices 102 and 104 or a server 106 are capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
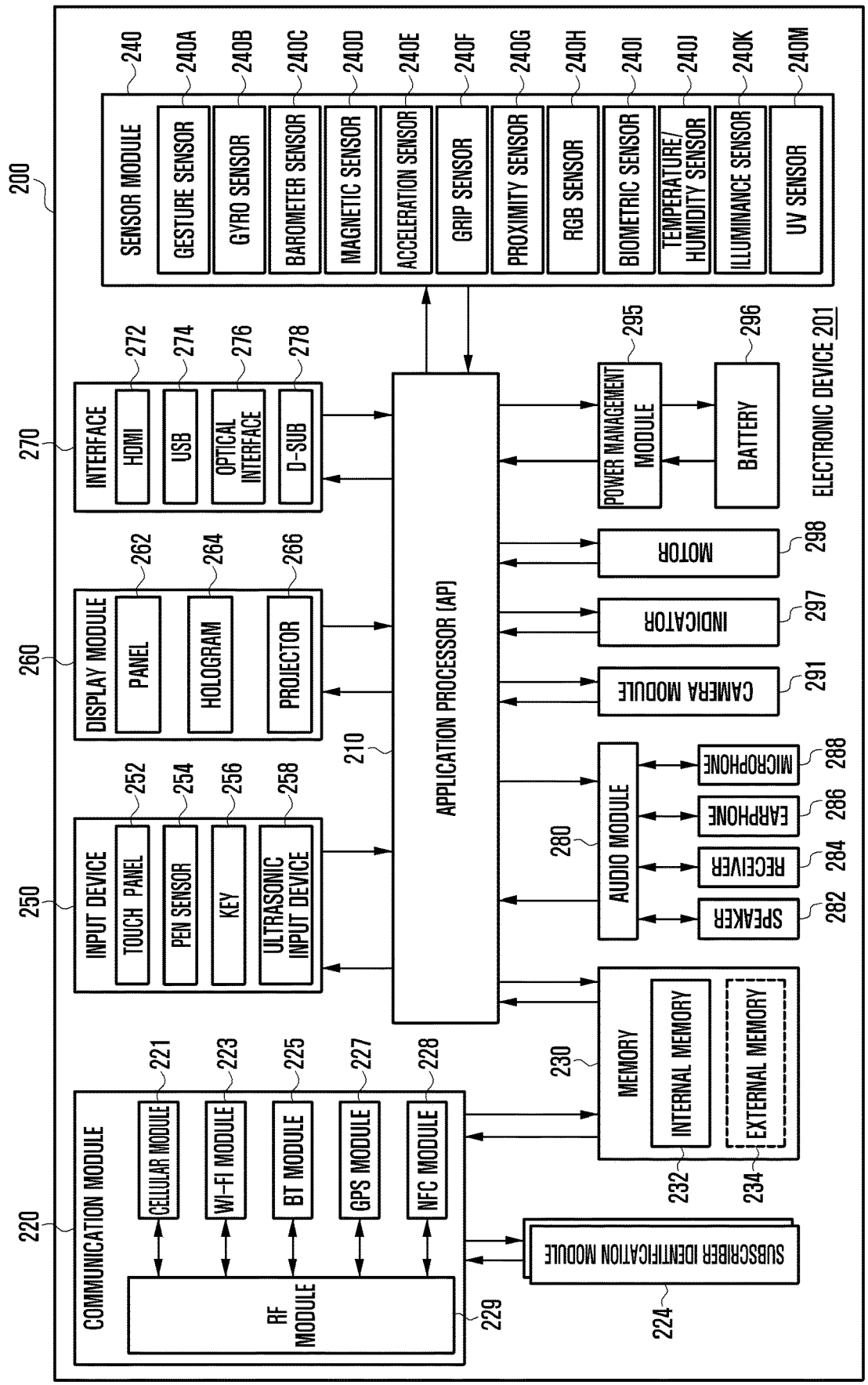
FIG. 2 is a block diagram of an electronic device, according to an embodiment of the present disclosure.

FIG. 2 is a block diagram of an electronic device, according to an embodiment of the present disclosure Referring to FIG. 2, the electronic device 201 may include part or all of the components in the electronic device 101 shown in FIG. 1. The electronic device 201 includes one or more processors 210 (e.g., application processors (APs)), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a system on chip (SoC). According to an embodiment of the present disclosure, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 may include the cellular module 221, WiFi module 223, Bluetooth (BT) module 225, GNSS module 227 (e.g., a GPS module, Glonass module, Beidou module or Galileo module), NFC module 228, and radio frequency (RF) module 229.

The cellular module 221 is capable of providing a voice call, a video call, an SMS service, an Internet service, etc., through a communication network, for example. According to an embodiment of the present disclosure, the cellular module 221 is capable of identifying and authenticating an electronic device 201 in a communication network by using a subscriber identification module (SIM) 224 (e.g., a SIM card). The cellular module 221 is capable of performing at least part of the functions provided by the processor 210. The cellular module 1721 is also capable of including a communication processor (CP).

Each of the WiFi module 223, the BT module 225, the GNSS module 227, and the NFC module 228 may include a processor for processing data transmitted or received through the corresponding module. According to an embodiment of the present disclosure, at least part of the cellular module 221, WiFi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 may include a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module.

The SIM 224 may include a card including a subscriber identification module (SIM) and/or an embedded SIM. The SIM module 224 is also capable of containing unique identification information, e.g., integrated circuit card identifier (ICCID), or subscriber information, e.g., international mobile subscriber identity (IMSI).

The memory 230 includes a built-in memory 232 or an external memory 234. The built-in memory 232 may include a volatile memory, e.g., a dynamic RAM (DRAM), a static RAM (SRAM), a synchronous dynamic RAM (SDRAM), etc., and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 includes a touch panel 252, a (digital) pen sensor 254, a key 256, or an ultrasonic input unit 258. The touch panel 252 may be implemented with a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 includes a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment of the present disclosure, the display 260 may further include a control circuit for controlling the panel 262, the hologram unit 264, or the projector 266.

The interface 270 includes a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 may include a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc.

The camera module 291 refers to a device capable of taking both still and moving images. According to an embodiment of the present disclosure, the camera module 291 may include one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment of the present disclosure, the power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, voltage, current, or temperature of the battery 296. The battery 296 may take the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 is capable of further including a processing unit (e.g., GPU) for supporting mobile TV. The processing unit for supporting a mobile TV is capable of processing media data pursuant to standards, e.g., digital multimedia broadcasting (DMB), digital video broadcasting (DVB), or MediaFlo™, etc.

Figure 3:
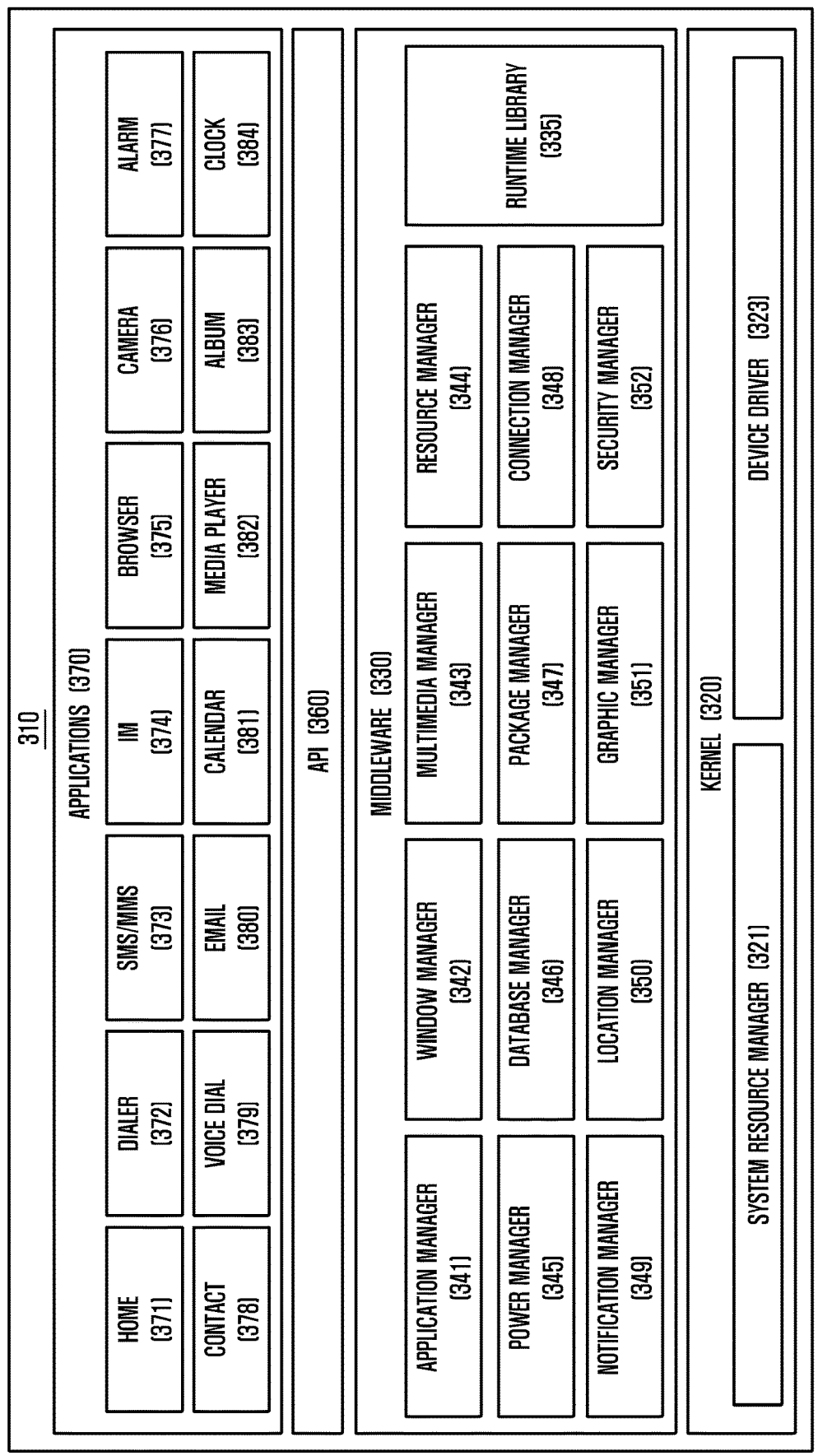
FIG. 3 is a block diagram of a program module, according to an embodiment of the present disclosure.

FIG. 3 is a block diagram of a programming module according to an embodiment of the present disclosure.

Referring to FIG. 3, the program module includes an operation system (OS) for controlling resources related to the electronic device 101 and/or various applications (e.g., application programs 147 shown in FIG. 1) running on the OS. The OS may be Android™ iOS™, Windows™, Symbian™, Tizen™, Bada™, etc.

The program module 310 includes a kernel 320, middleware 330, application programming interface (API) 360 and/or applications 370. At least part of the program module 310 may be preloaded on the electronic device or downloaded from an electronic device 102 or 104, or server 106, etc.

The kernel 320 includes a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an inter-process communication (IPC) driver.

The middleware 330 may provide a function required in common by the applications 370. Further, the middleware 330 may provide a function through the API 360 to allow the applications 370 to efficiently use limited system resources within the electronic device. According to an embodiment of the present disclosure, the middleware 330 includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment of the present disclosure, the runtime library 335 executes input and output, management of a memory, a function associated with an arithmetic function, and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm and the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment of the present disclosure, when the electronic device 101 has a call function, the middleware 330 may further include a telephony manager for managing a voice of the electronic device or a video call function.

The middleware 330 may include modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android™ or iOS™, a single API set may be provided for each platform. In Tizen™, two or more API sets may be provided.

The applications include one or more applications for performing various functions, e.g., home 371, diary 372, SMS/MMS 373, instant message (IM) 374, browser 375, camera 376, alarm 377, contact 378, voice dial 379, email 380, calendar 381, media player 382, album 383, clock 384, health care (e.g., an application for measuring an amount of exercise, blood sugar level, etc.), and environment information (e.g., an application for providing atmospheric pressure, humidity, temperature, etc.).

According to an embodiment of the present disclosure, the applications 370 may include an information exchange application for supporting information exchange between electronic device 101 and electronic devices 102 and 104, which is hereafter called 'information exchange application'. The information exchange application may include a notification relay application for relaying specific information to external devices or a device management application for managing external devices.

For example, the notification relay application may include a function for relaying notification information, created in other applications of the electronic device (e.g., SMS/MMS application, email application, health care application, environment information application, etc.) to electronic devices 102 and 104. In addition, the notification relay application is capable of receiving notification information from external devices to provide the received information to the user.

The device management application is capable of managing (e.g., installing, removing or updating) at least one function of electronic devices 102 and 104 communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment of the present disclosure, the applications 370 may include an application (e.g., a health care application of a mobile medical device, etc.) specific to the attributes of electronic devices 102 and 104. The applications 370 may include applications received from a server 106 or electronic devices 102 and 104. The applications 370 are capable of including a preloaded application or third party applications that may be downloaded from a server. It should be understood that the components of the program module 310 may be called different names according to the type of operating system.

According to an embodiment of the present disclosure, at least part of the program module 310 may be implemented with software, firmware, hardware, or any combination of two or more of them. At least part of the program module 310 may be implemented (e.g., executed) by a processor (e.g., processor 210). At least part of the programming module 310 may include modules, programs, routines, sets of instructions or processes, etc., in order to perform one or more functions.

Figure 4:
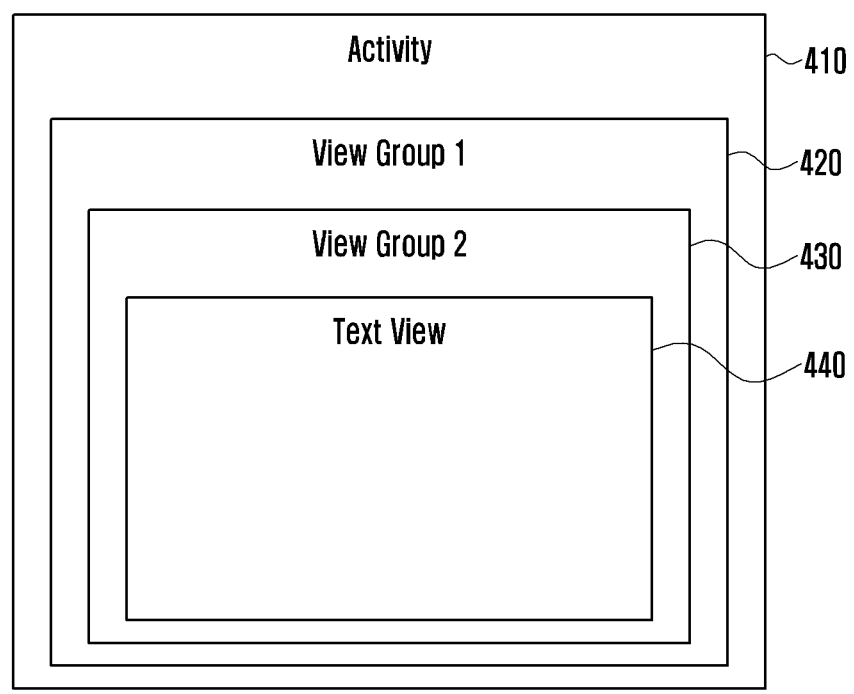
FIG. 4 is a diagram illustrating an activity displayed on a screen of an electronic device, according to an embodiment of the present disclosure.

FIG. 4 is a diagram illustrating an activity displayed on a screen of an electronic device, according to an embodiment of the present disclosure.

Referring to FIG. 4, the activity 410 is displayed on the display 160 (i.e., the screen) of the electronic device 101. According to an embodiment of the present disclosure, the activity 410 may be an execution window having at least one view object. The activity 410 may include a plurality of execution windows and may be displayed on the screen through a view. For example, the processor 120 of the electronic device 101 may display, on the display 160, such an execution window associated with at least one activity 410 resulting from the execution of an application. The activity 410 may be the unit of a task performed by the execution of an application. The activity 410 may provide certain information to a user or correspond to an execution window for receiving a user input. Through this execution window, a user may check the content of the activity 410 or enter necessary information for the execution of the activity 410. The activity 410 may include information about the execution window (e.g., the size, location, configuration, etc. of the execution window). The activity 410 may be referred to as any other name (e.g., an execution window, a window, and the like) depending on an operating system or a frame work system.

According to an embodiment of the present disclosure, the electronic device may execute an application and then display, on the screen, an execution window associated with an activity based on the executed application. The electronic device may receive a user input for processing an activity and then perform a particular (predetermined) operation (e.g., the execution of a specific button, a touch on a specific location of a screen, and the like) in response to the received user input.

According to an embodiment of the present disclosure, the activity 410 may be a main element forming the application 147 stored in the memory 130 of the electronic device 101. Namely, the application 147 may be a program formed of one or more activities 410. Also, a user interface provided by the electronic device 101 may be formed of the activity 410. The activity 410 may be formed of one or more view layers. The view layer may have view objects. The view object may be referred to as a UI object and receive a user input. The view object may include an object represented on a certain region of the screen. The respective view layers may have different view objects, or some overlapped view layers may represent a single view object. For example, a single view object which is seen from the display 160 of the electronic device 101 may be overlapped view objects on multiple view layers. The electronic device 101 may provide various functions with regard to such a view object which appears like a single view object. As shown in FIG. 4, the activity 410 may be formed of view groups (e.g., the first view group 420 and the second view group 430) and a text view 440.

According to an embodiment of the present disclosure, the electronic device 101 may display a visual application screen through the display 160, based on view layers contained in the activity 410. Namely, one or more view layers may form the activity, and one or more activities may form an application. The view layer may be a main element forming a user interface (UI), represent a specific shape of a certain region through the display, and receive a user input (e.g., a touch event, a touch input). The view layer may be classified into view groups 420 and 430 and a widget.

According to an embodiment of the present disclosure, the widget is a specific layer inherited from the view layer and may be an element forming a user interface (UI). The widget may be also referred to as a control, which may display information and receive a user input.

According to an embodiment of the present disclosure, the view groups 420 and 430, each of which is inherited from the view layer, may be contained in the widget. The view group may have a widget as a child and may also have a plurality of widgets. Using a layout, the view group may allow a user to form a user interface (UI). This layout, which is a sub-layer of the view group, may simply arrange and dispose the user interface.

Referring to FIG. 4, the activity 410 may be formed of the first view group 420, the second view group 430, and the text view 440. Although FIG. 4 shows two view groups and one text view, this is exemplary only and not to be construed as a limitation. Each of the first and second view groups 420 and 430 may contain at least one view object and receive a user input corresponding to the view object (e.g., a touch event, a touch input).

According to an embodiment of the present disclosure, an electronic device may include a memory configured to store a first predetermined condition and a second predetermined condition both of which are used for determining whether an input for one or more displayed view objects is valid, a display, and a processor functionally connected with the memory and the display. The processor may be configured to display the view objects using a first view layer and a second view layer at least partially overlapped with the first view layer, to obtain a user input regarding the displayed view object, if a movement of the user input satisfies the first predetermined condition, process the user input by using the first view layer, and if the movement of the user input satisfies the second predetermined condition, process the user input by using the second view layer.

The processor may be further configured to provide a particular function selected from a first function corresponding to the first view layer and a second function corresponding to the second view layer in response to the user input.

The processor may be further configured to obtain the user input through a region overlapped with at least a part of the first view layer and at least of a part of the second view layer.

The electronic device may further include a touch panel, and the processor may be further configured to form at least a part of a controller for controlling the touch panel.

The first predetermined condition and the second predetermined condition may be set to correspond to the view layers by the processor, and the processor may be further configured to, if the movement of the user input satisfies the first and second predetermined conditions, process the user input on a specific view layer for which the satisfied conditions are set.

The processor may be further configured to predetermine a plurality of conditions corresponding to the first and second view layers and also to define a plurality of functions corresponding to the plurality of predetermined conditions.

The first and second predetermined conditions may include at least one threshold in connection with at least one of a direction of the user input, a movement distance of the user input, and a touch pressure of the user input.

If the first view layer is an upper view layer with respect to the second view layer, the threshold of the first predetermined condition may be set to be smaller than the threshold of the second predetermined condition.

When the movement of the user input fails to exceed the threshold of the second predetermined condition, the movement of the user input may be set to be compared with the threshold of the first predetermined condition.

Figure 5A:
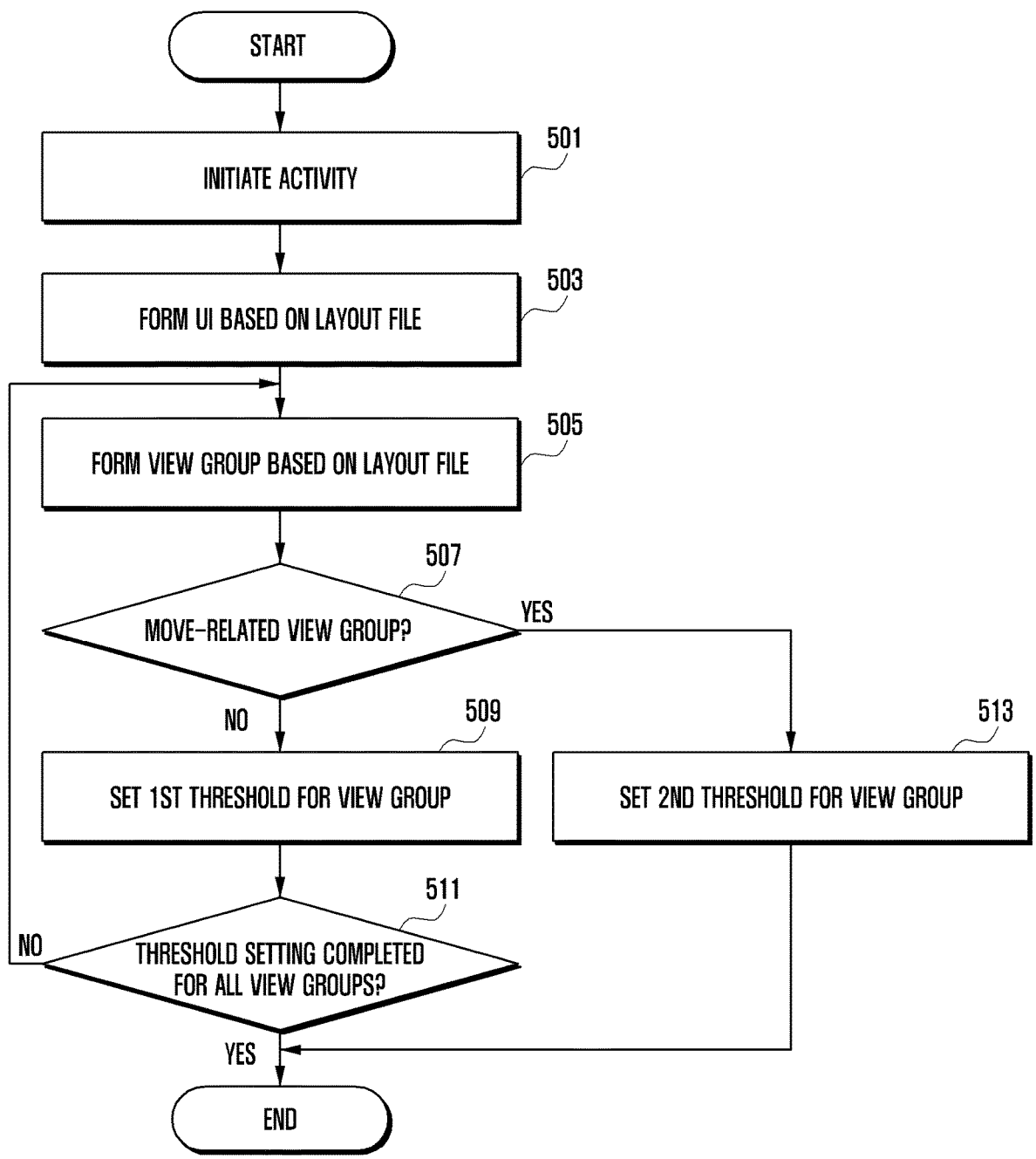
FIG. 5A is a flowchart of a method of setting a threshold for view groups, according to an embodiment of the present disclosure.

FIG. 5A is a flowchart of a method of setting a threshold for view groups, according to an embodiment of the present disclosure.

Referring to FIG. 5A, the flowchart illustrates a method of using a threshold (e.g., a reference value for determining a touch movement in a view group, often referred to as a touch slop) corresponding to a view group.

Herein, a threshold is a reference value for a touch movement in a certain view group. Namely, when any touch movement event is delivered to a view group, a threshold may be used to determine whether to process a function corresponding to the event in the view group.

Referring to FIG. 5A, at step 501, the processor 210 of the electronic device 201 initiates activity. For example, the processor 210 may initiate the activity by executing an application installed in the memory 230. At step 503, the processor 210 forms a user interface, based on a layout file for the activity or on the content recorded in an application program. At step 505, the processor 210 forms a view group, based on the layout file or the content in the application program.

At step 507, the processor 210 determines whether the view group is associated with a movement. For example, the processor 210 may determine whether the view group may perform a movement-related function (e.g., scroll, flip, an object move, etc.). If the view group is not associated with a movement, the processor 210 sets the first threshold (e.g., the first touch slop, or a default touch slop) for the view group at step 509. According to an embodiment of the present disclosure, the processor 210 may define a certain threshold (e.g., a default touch slop) stored in the memory 230 (or a particular file) as the threshold corresponding to the view group. The processor 210 may read different thresholds (e.g., application touch slops) for respective applications or respective view groups and then store them as the first thresholds. At step 511, the processor 210 determines whether setting of a threshold (e.g., a touch slop) is completed for all view groups. If the threshold setting is completed for all view groups, the processor 210 terminates a threshold setting procedure. The step 511 may be omitted. For example, the processor 210 may terminate the threshold setting procedure without determining whether the threshold setting is completed for all view groups. Some view groups for which thresholds are not set at the initiation of the activity may use any basic threshold during a program runtime.

If it is determined at step 507 that the view group is associated with a movement, the processor 210 may set the second threshold (e.g., the second touch slop, or a movement touch slop) for the view group at step 513. According to an embodiment of the present disclosure, the processor 210 may define a movement threshold (e.g., a movement slop) stored in the memory 230 (or a particular file) as the threshold corresponding to the view group. The processor 210 may define the second threshold as a value smaller than the first threshold. For example, the processor 210 may use, as the second threshold, the first threshold minus an arbitrary constant (i.e., a movement touch slop=a touch slop–alpha). A certain touch slop value smaller than a normal touch slop value may be defined as a touch slop value corresponding to a movement-associated view group.

According to an embodiment of the present disclosure, the second threshold (e.g., a move touch slop) may be defined differently in connection with events available for each view group.

FIG. 5B is a table illustrating data corresponding to view groups, according to an embodiment of the present disclosure.

FIG. 5B is a table for identifying view groups associated with a movement. For example, the movement axis may be, but is not limited to, the X-axis, the Y-axis, and both axes.

Referring to FIG. 5, the view group corresponding to the X-axis may include ScrollView, HorizontalScrollView, and the like.

The view group corresponding to the Y-axis may include ListView, GridView, ExpandableListView, and the like. The view group corresponding to both axes may be remaining view groups. The view group corresponding to the X-axis may have a movement touch slop value corresponding to the X-axis and thus detect a touch input moving in the X-axis direction. The view group corresponding to the Y-axis may have a movement touch slop value corresponding to the Y-axis and thus detect a touch input moving in the Y-axis direction.

The electronic device according to an embodiment of the present disclosure, may store different thresholds (e.g., touch slops) used for determining a touch movement with regard to respective view groups. Particularly, the electronic device may define a touch slop value for a move-related view group (e.g., a view group capable of performing a function in response to the movement of a touch input) as a smaller value than a normal touch slop value. Setting of different touch slop values for respective view groups may minimize the occurrence of an incorrect operation which is different from a user's intention.

Figure 6:
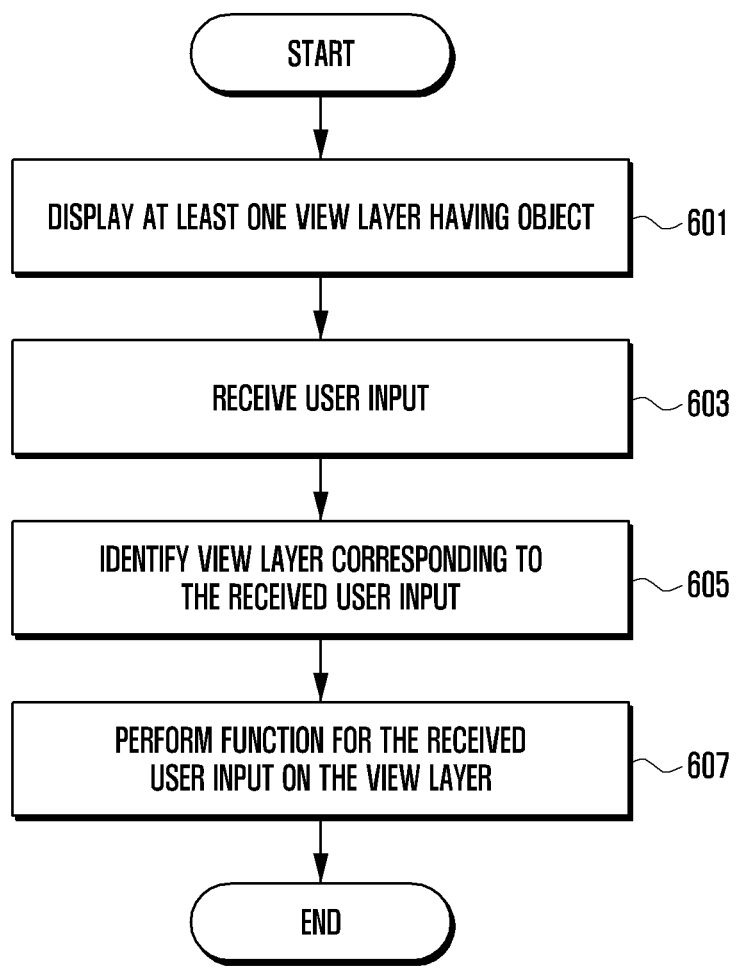
FIG. 6 is a flowchart of a method of performing a function in response to a user input, according to an embodiment of the present disclosure.

FIG. 6 is a flowchart of a method of performing a function in response to a user input, according to an embodiment of the present disclosure.

Referring to FIG. 6, at step 601, the processor 210 of the electronic device 201 displays at least one view layer including at least one view object. Herein, the view layer may be a view layer which forms an application. The processor 210 may display the view layer including the view object(s) through a display module 260.

At step 603, the processor 210 receives a user input. This user input may be received through an input device 250 of the electronic device 201. Herein, the user input may be a touch input by means of a user's body part (e.g., a finger) or an external input device (e.g., an electronic pen, a mouse, a joystick, etc.). According to an embodiment of the present disclosure, the electronic device 201 may have a touch display and receive a user input through the touch panel 252 of the touch display. The display module 260 and the touch panel 252 may be stacked or separated in the electronic device 201. The display module 260 may be contained in an external electronic device, and the touch panel 252 may be contained in the electronic device 201. Namely, one electronic device for receiving a touch input and another electronic device for displaying information in response to the touch input may be separated physically but coupled electrically. The processor 210 of the electronic device 201 may have a controller for a driving IC of the touch panel 252. The following description will be based on the touch display having the display module 260 and the touch panel 252.

At step 605, the processor 210 identifies a view layer corresponding to the received user input. For example, the processor 210 may display a plurality of view layers through the display module 260, and each view layer may have the view object(s). The respective view layers may perform different operations in response to the user input. For example, when there is a first view layer and a second view layer and the first view layer is an upper view layer and the second view layer is a lower view layer, the first view layer may receive a user input in the Y-axis direction and then perform a function corresponding to this user input. The user input in the Y-axis direction may refer to a user input which moves in any direction corresponding to the Y-axis. Similarly, the second view layer may receive a user input in the X-axis direction and then perform a function corresponding to this user input. Each view layer may be set in advance to perform a particular function on the basis of a user input in a specific direction. The processor 210 may determine whether the received user input is a user input corresponding to the Y-axis direction or the X-axis direction, and then identify a view layer corresponding to the determined user input. If it is determined that the user input corresponds to the Y-axis direction, the processor 210 may regard this user input as a user input for the first view layer. Similarly, if it is determined that the user input corresponds to the X-axis direction, the processor 210 may regard this user input as a user input for the second view layer. Although X-axis and Y-axis directions are used herein, this is exemplary only and not to be construed as a limitation.

According to an embodiment of the present disclosure, a function having to be processed on each view layer may be predetermined. Additionally, a touch event (e.g., a movement event, a scroll event, a tap event, an up event) processed on each view layer may be predetermined. Each view layer may be identified, based on a touch event. For example, the first view layer may be set to process a movement event (e.g., an X-axis movement, a Y-axis movement), and the second view layer may be set to process a scroll event. The other layers may be set to process a tap event.

According to an embodiment of the present disclosure, a threshold (e.g., a reference value, a touch slop) may be set to determine the movement of a touch manipulation resulting from a user input. The processor 210 may store the threshold in the memory 230 and, if the threshold is changed, may store the changed threshold. The processor 210 may store the threshold which may be applied in common to installed applications. The processor 210 may store different thresholds for respective installed applications. The unit of threshold may be pixels or density-independent pixels (DP).

According to an embodiment of the present disclosure, the processor 210 may identify a touch event (e.g., a user input) corresponding to touch coordinates. For example, the touch event may include a touch-down event (or a touch starting event), a touch-movement event, and a touch-up event (or a touch finishing event). For example, with regard to a single sequential touch manipulation, the processor 210 may determine first detected touch coordinates as a touch-down event, and also determine last detected touch coordinates as a touch-up event. Further, the processor 210 may determine the remaining touch coordinates, other than first or last detected touch coordinates, as a touch-movement event.

According to an embodiment of the present disclosure, when receiving a user input, the processor 210 may determine that touch coordinates are changed by an influence of a finger contact area or a small movement of a finger even though a user does not intend to move a touch manipulation (e.g., a tap input). As discussed above, in order to prevent an incorrect operation being different from a user's intention, a threshold may be used to determine whether a touch manipulation is moved. Each threshold may be set for each view layer, and such a threshold may be set in connection with a function which may be performed on each view layer.

According to an embodiment of the present disclosure, each view layer may have one or more predetermined thresholds. For example, each view layer has an X-axis threshold (i.e., a threshold in the X-axis direction) and a Y-axis threshold (i.e., a threshold in the Y-axis direction). Based on a user input (e.g., a touch event) that exceeds the threshold, a view layer on which the user input occurs may be identified. When view layers that perform a function corresponding to a user input in the same direction are overlapped, the threshold of a lower view layer may be set greater than that of an upper view layer. After a view layer is identified on the basis of a user input, a function corresponding to the user input may be performed only when a touch input value (e.g., a travel distance, a touch pressure or intensity, a touch direction, a variation of touch coordinates) corresponding to the user input exceeds the predetermined threshold corresponding to the view layer. By setting the threshold of a lower view layer to be greater than that of an upper view layer, a function having to be performed on the lower view layer may not be performed on the upper view layer. This may minimize the occurrence of an incorrect operation of the electronic device 201 and allow a function of the electronic device to be performed according to a user's intention.

At step 607, the processor 210 performs a particular function in response to the received user input on the identified view layer. For example, the processor 210 may determine whether a touch input value (e.g., a travel distance, a touch pressure/intensity, a touch direction) of a user input in the Y-axis direction exceeds a predetermined threshold for the identified view layer. If so, the processor 210 may perform a particular function in response to the user input on the view layer for performing operations in the Y-axis direction.

According to an embodiment of the present disclosure, the threshold may be set for each view layer. In general, the threshold for a user input regarding a view layer may be set to be smaller than that of a normal user input. Each threshold predetermined for each view layer may be stored in the memory, and one or more thresholds may be set for each view layer.

Figure 7:
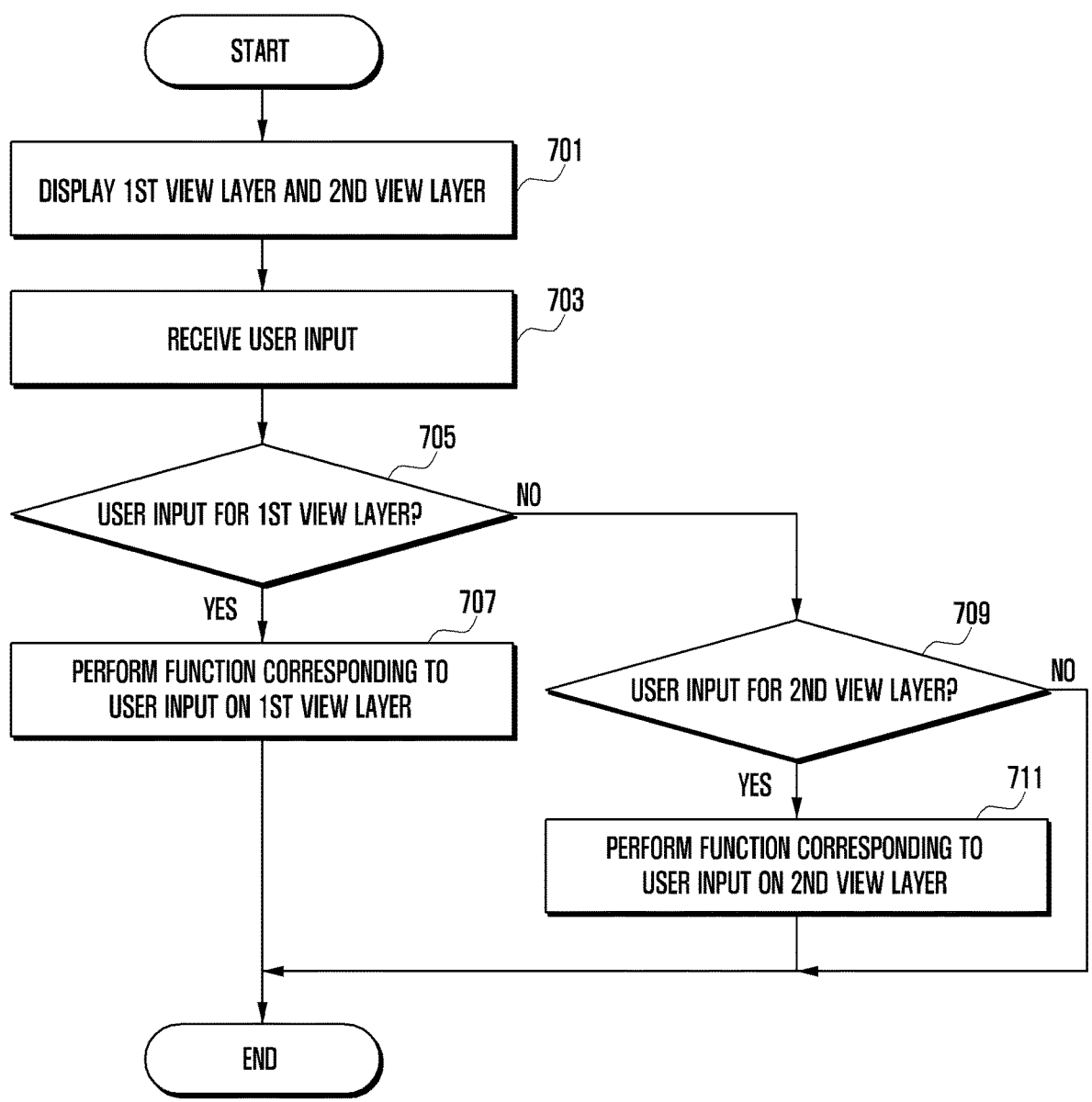
FIG. 7 is a flowchart of another method of performing a function in response to a user input, according to an embodiment of the present disclosure.

FIG. 7 is a flowchart of another method of performing a function in response to a user input according to an embodiment of the present disclosure.

Referring to FIG. 7, at step 701, the processor 210 displays the first view layer and the second view layer. The processor 210 may display a user interface (UI) through the display module 260, and the user interface may be formed of the first view layer and the second view layer. The first and second view layers may be overlapped in which the first view layer is an upper view layer and the second view layer is a lower layer. The first view layer may be partially covered, when displayed, with the second view layer.

At step 703, the processor 210 receives a user input through the input device 250. At step 705, the processor 210 determines whether the received user input is a user input corresponding to the first view layer. For example, if the first view layer performs a function in response to a user input in the Y-axis direction (e.g., a touch input moving in the Y-axis direction), the processor 210 may check whether the user input corresponds to the Y-axis direction. If so, the processor 210 performs a function corresponding to the user input on the first view layer at step 707. The direction of a user input that may be performed on the first view layer may be predetermined. Herein, this user input may be identified by means of a direction, force, pressure, strength, intensity, etc. of the user input. For example, the first view layer may be set to perform a function corresponding to a user input only in the Y-axis direction. Namely, the first view layer may ignore any user input in the X-axis direction. A threshold (e.g., a reference value, a touch slop) of the user input may be set for the first view layer, and a particular function corresponding to the user input may be performed on the first view layer only when a variation of touch coordinates resulting from the user input satisfies the predetermined threshold. The processor 210 may determine, based on the predetermined threshold, whether the user input has moved. For example, the processor 210 may compare a variation of touch coordinates resulting from the user input with the predetermined threshold and then, depending on the comparison result, determine whether the user input has moved. For example, if the variation of touch coordinates is less than the predetermined threshold, the processor 210 may determine that the user input is fixed (i.e., has not moved).

If the direction of a user input that may be performed on the first view layer is determined as both the X-axis and Y-axis directions, the processor 210 may set individually an X-axis threshold and a Y-axis threshold. Then the processor 210 may compare each threshold with an input value of the user input.

If it is determined at step 705 that the received user input is not a user input regarding the first view layer, the processor 210 further determines at step 709 whether the received user input is a user input regarding the second view layer. For example, if the second view layer is a view layer capable of performing a function in response to the user input corresponding to the X-axis direction, the processor 210 may check whether the user input corresponds to the X-axis direction. If so, the processor 210 performs a function corresponding to the user input on the second view layer at step 711. The threshold of the user input may be predetermined for the second view layer, and a function corresponding to the user input may be performed on the second view layer when the user input satisfies the predetermined threshold.

According to an embodiment of the present disclosure, the threshold regarding a user input may be set individually for each view layer contained in a user interface. Such a threshold may be set based on the direction of a user input that may be performed on the view layer. For example, if the first view layer is a view layer which performs a function in response to a user input in the Y-axis direction, the processor may set the threshold associated with the Y-axis direction (i.e., a Y-axis threshold) for the first view layer. Similarly, if the second view layer is a view layer which performs a function in response to a user input in the X-axis direction, the processor may set the threshold associated with the X-axis direction (i.e., an X-axis threshold) for the second view layer. The threshold may be set based on the pressure of a user input. For example, a pressure threshold may be set for a user's touch input on each view layer. In addition, the processor may measure a pressure value of a user's touch input and then compare the measured pressure value with the predetermined pressure threshold. If the measured pressure value exceeds the predetermined pressure threshold, the processor may perform a function corresponding to the user input. At least one threshold may be set for each view layer, based on a user input. Such at least one threshold may be stored in the memory 230.

Figure 8:
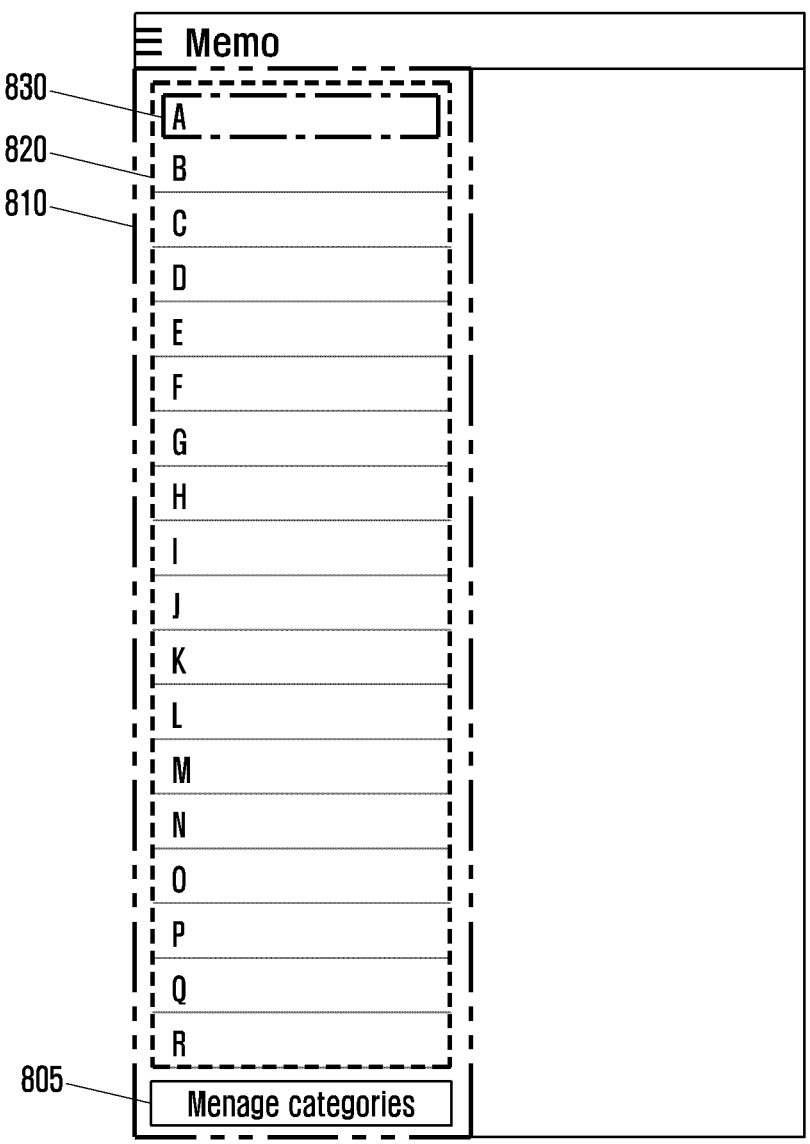
FIG. 8 is a diagram of a user interface having different view layers, according to an embodiment of the present disclosure.

FIG. 8 is a diagram of a user interface having different view layers, according to an embodiment of the present disclosure.

Referring to FIG. 8, the processor 210 may display a user interface regarding a memo application through the display module 260. This user interface regarding the memo application may contain one or more view layers. For example, the processor 210 may display a view layer corresponding to 'a list menu' (hereinafter, the first view layer 810), a view layer corresponding to 'a list' (hereinafter, the second view layer 820), and a view layer corresponding to 'a list item' (hereinafter, the third view layer 830) together. Referring to FIG. 8, the processor 210 displays the second view layer 820 over the first view layer 810 and also displays the third view layer 830 over the second view layer 820. The first view layer 810 may be partially covered by the second view layer 820, and also the second view layer 820 may be partially covered by the third view layer 830.

According to an embodiment of the present disclosure, the first view layer 810 which is a view layer corresponding to a list menu may contain a layout for displaying a memo list. The first view layer 810 may be the uppermost layer among the view layers contained in the memo application.

According to an embodiment of the present disclosure, the second view layer 820 which is a view layer corresponding to a list may scroll the displayed memo list in response to a user input. For example, the second view layer 820 may receive a user input corresponding to upward and downward directions, i.e., in the Y-axis direction, and then scroll the displayed memo list in response to the received user input. The second view layer 820 may be an intermediate layer among the view layers contained in the memo application.

According to an embodiment of the present disclosure, the third view layer 830 which is a view layer corresponding to a list item may select a memo (i.e., a list item) in response to a user input. The third view layer 830 is displayed in an overlay form over the second view layer 820 and may be formed individually for each list item contained in the list of the second layer. The third view layer 830 may select a specific list item in response to a user's selection. The third view layer 830 may be the lowermost layer among the view layers contained in the memo application.

According to an embodiment of the present disclosure, a user input may be received through the third view layer 830. The processor 210 may determine whether the received user input is for the first view layer 810, for the second view layer 820, or for the third layer 830. For example, when the first view layer 810 performs a function in response to an X-axis directional input, the second view layer 820 may perform a function in response to a Y-axis directional input, and the third view layer 830 may perform a function in response to a single touch input. If the received user input corresponds to a Y-axis directional input, the processor 210 may determine that the user input is for the second view layer 820. A threshold may be predetermined (or set) for each view layer. This threshold may be predetermined on the basis of a user input. For example, an X-axis threshold regarding a user input in the X-axis direction, a Y-axis threshold regarding a user input in the Y-axis direction, a pressure threshold regarding the pressure of a user input, and the like may be predetermined. If the received user input exceeds such a predetermined threshold, the processor 210 may perform a function corresponding to the user input.

If both the first view layer and the second view layer perform a function regarding a Y-axis directional input, the processor 210 may set differently the Y-axis threshold of the first view layer 810 and the X-axis threshold of the second view layer 820. For example, if the first view layer 810 is an upper view layer with respect to the second view layer 820, the Y-axis threshold regarding the first view layer 810 may be smaller than the Y-axis threshold regarding the second view layer 820. At least one threshold of the respective view layers contained in the user interface may be set differently, and also at least one threshold of each view layer may be set differently for respective functions. A view layer corresponding to a user input may be determined, based on an input value of the user input, and also a function corresponding to the user input may be performed by comparing the predetermined threshold for the determined view layer with the input value of the user input.

Figure 9:
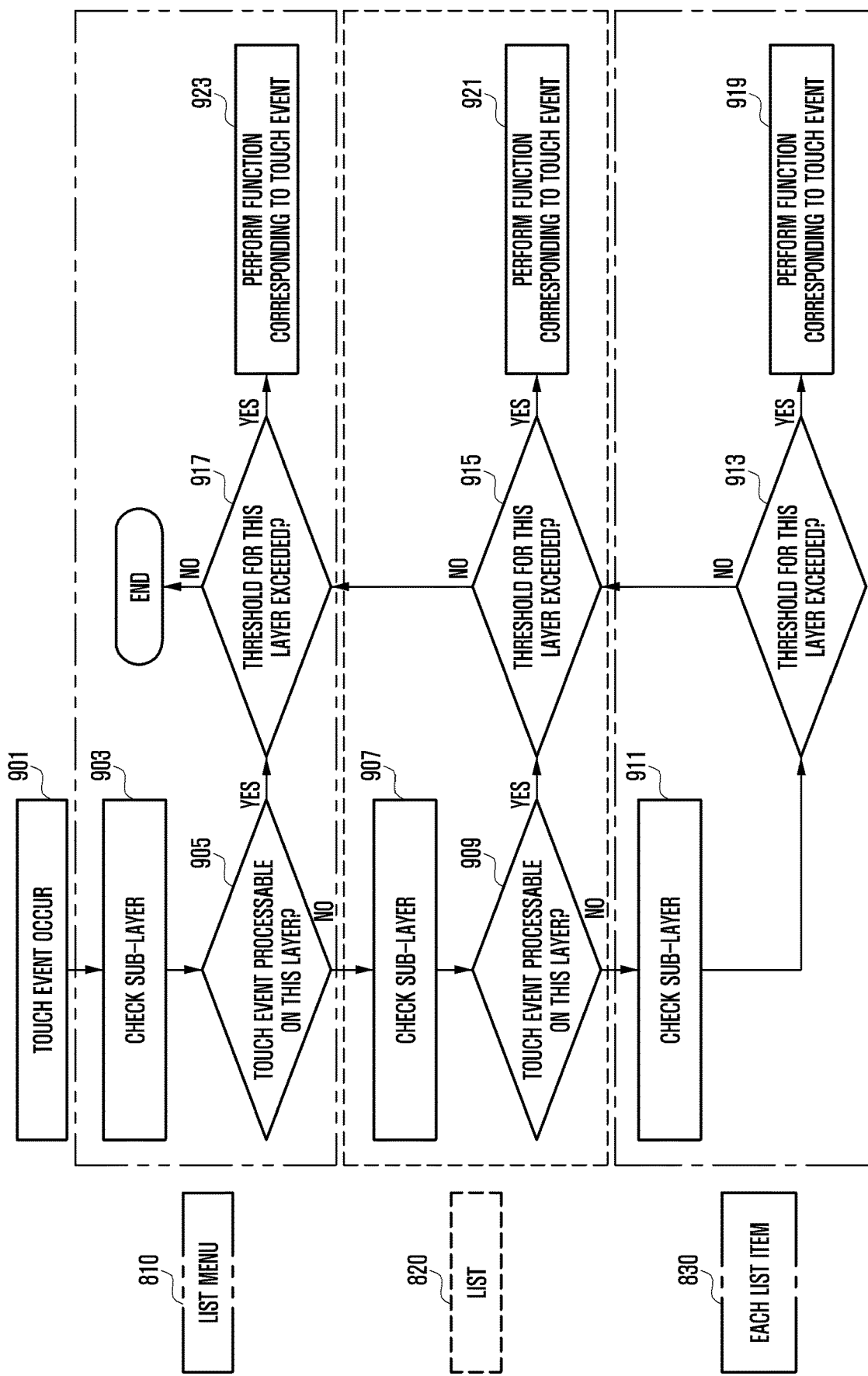
FIG. 9 is a flowchart of a method of identifying a view layer and performing operations on each identified view layer, according to an embodiment of the present disclosure.

FIG. 9 is a flowchart of a method of identifying a view layer and performing operations on each identified view layer, according to an embodiment of the present disclosure.

FIG. 9 shows a method of processing a user input (e.g., a touch event) on each view layer, based on a user interface regarding the memo application shown in FIG. 8. Although FIG. 9 illustrates a view layer structure using the user interface shown in FIG. 8, this is for illustrative purposes only and not to be construed as a limitation.

According to an embodiment of the present disclosure, the processor 210 may display a user interface regarding a memo application through the display module 260. The user interface may be formed of the first view layer 810 corresponding to 'a list menu', the second view layer 820 corresponding to 'a list', and the third view layer 830 corresponding to 'each list item'. For example, the first view layer 810 may be a view layer which displays a layout of a list. The second view layer 820 may be a view layer which processes a screen movement (e.g., scroll) for the list in response to a touch-movement event. The third view layer 830 may be a view layer which processes a selection function for each list item in response to a touch-up event. At step 901, the processor 210 identifies the occurrence of a touch event (e.g., a user input) through the input device 250 of the electronic device 201. The processor 210 may enable the first view layer 810, which is the uppermost layer, to receive the touch event. If a touch-up event occurs soon after a touch-down event, the third view layer 830 may perform a selection function for each list item.

At step 903, the processor 210 checks whether there is a sub-layer on the basis of the first view layer 810. At step 905, the processor 210 determines whether the touch event is processed on the first view layer 810. For example, the first view layer 810 may be a view layer which performs a function regarding a movement event corresponding to the Y-axis direction. In this case, the processor 210 may determine whether the touch event is a movement event corresponding to the Y-axis direction. If so, the processor 210 may determine that the touch event may be processed on the first view layer 810.

If the touch event may be processed on the first view layer 810, the processor 210 further determines at step 917 whether the touch event is a touch event for the first view layer 810. Namely, at step 917, the processor 210 checks specific input information (e.g., information about touch coordinates, information about whether the touch event is a drag input or a flicking input, information about whether the touch event is a single touch or a multi touch, and information about the pressure of a touch input) about the touch event. For example, the processor 210 may predetermine (or set) a threshold for a touch event of the first view layer 810. This threshold may be a value regarding coordinates of the touch event moving for a certain time or a value regarding a touch pressure of the touch event. The threshold may be defined as a touch slop value and a movement touch slop value. Also, this threshold may be determined, based on the type of event which may be (or should be) processed on a view layer. For example, if a view layer is a movement related view layer capable of processing a movement event, the processor 210 may store a movement touch slop value as the threshold corresponding to the view layer. If the view layer is a view layer not capable of processing a movement event, the processor 210 may store a touch slop value as the threshold corresponding to the view layer. The processor 210 may predetermine the threshold corresponding to the first view layer 810 and, if a touch event exceeding the threshold occurs, may perform a function corresponding to the touch event. If the touch event exceeds the predetermined threshold at step 917, the processor 210 performs a function corresponding to the touch event on the first view layer 810 at step 923. For example, the first view layer 810 may be a view layer which performs a function in response to a movement event in the Y-axis direction. In this case, the processor 210 may predetermine a Y-axis threshold. If any touch event is a movement event corresponding to the Y-axis direction and also exceeds the predetermined Y-axis threshold, the processor 210 may perform a function corresponding to the movement event. If the touch event is a movement event corresponding to the Y-axis direction but fails to exceed the predetermined Y-axis threshold, the processor 210 may terminate this procedure without performing a function corresponding to the movement event.

If it is determined at step 905 that the touch event may not be processed on the first view layer 810, the processor 210 may deliver the touch event to a sub-layer, i.e., the second view layer 820 (corresponding to 'a list').

At step 907, the processor 210 checks whether there is a sub-layer on the basis of the second view layer 820. At step 909, the processor 210 determines whether the touch event may be processed on the second view layer 820. For example, the second view layer 820 may be a view layer which performs a function regarding a movement event corresponding to the X-axis direction. In this case, the processor 210 may determine whether the touch event is a movement event corresponding to the X-axis direction. If so, the processor 210 may determine that the touch event may be processed on the second view layer 820.

If the touch event may be processed on the second view layer 820, the processor 210 further determines at step 915 whether the touch event is a touch event for the second view layer 820. At step 915, the processor 210 checks specific input information about the touch event. For example, the processor 210 may predetermine a threshold (e.g., a movement touch slop value) for a touch event in the X-axis direction in connection with the second view layer 820. The processor 210 may predetermine the threshold and, if a touch event exceeding the threshold occurs, perform a function corresponding to the touch event. If the touch event exceeds the predetermined threshold at step 915, the processor 210 performs a function corresponding to the touch event on the second view layer 820 at step 921. For example, the second view layer 820 may be a view layer which performs a function in response to a movement event in the X-axis direction. In this case, the processor 210 may predetermine an X-axis threshold. If any touch event is a movement event corresponding to the X-axis direction and also exceeds the predetermined X-axis threshold, the processor 210 may perform a function corresponding to the movement event. If the touch event is a movement event corresponding to the X-axis direction but fails to exceed the predetermined X-axis threshold, the processor 210 may deliver the touch event to the first view layer 810 without performing a function corresponding to the movement event.

If it is determined at step 909 that the touch event may not be processed on the second view layer 820, the processor 210 delivers the touch event to a sub-layer, i.e., the third view layer 830 (corresponding to 'each list item').

At step 911, the processor 210 checks whether there is a sub-layer on the basis of the third view layer 830. Although the third view layer 830 is shown as the lowermost layer in FIG. 9, this is exemplary only. After determining at step 911 that there is no sub-layer, the processor 210 determines at step 913 whether the touch event is a touch event for the third view layer 830. At step 913, the processor 210 may check specific input information about the touch event. For example, the processor 210 may predetermine a threshold for a single touch in connection with the third view layer 830. This threshold may be associated with a touch pressure of the single touch. The processor 210 may predetermine the threshold and, if a touch event exceeding the threshold occurs, may perform a function corresponding to the touch event. If the touch event exceeds the predetermined threshold at step 913, the processor 210 performs a function corresponding to the touch event on the third view layer 830 at step 919. If any touch event fails to exceed the predetermined threshold, the processor 210 may deliver the touch event to the second view layer 820 without performing a function corresponding to the touch event.

According to an embodiment of the present disclosure, a touch event may be determined for each view layer, and a threshold may be set based on the touch event. At least one of such thresholds may be set differently for each view layer. Additionally, the different thresholds may be greater on a relatively lower layer. For example, when both the first view layer 810 and the second view layer 820 perform a function in response to a touch event corresponding to the X-axis direction, the processor 210 may set differently an X-axis threshold for the first view layer 810 and an X-axis threshold for the second view layer 820 and based on these X-axis thresholds, determine a view layer for processing a touch event. In this case, the processor 210 may set the X-axis threshold of the second view layer 820 to be greater than that of the first view layer 810. By doing so, a certain function to be performed on the second layer 820 may not be performed on the first view layer 810 minimizing the occurrence of an incorrect operation resulting from a touch event and also enhancing the touch performance of the electronic device.

According to an embodiment of the present disclosure, a method for operating an electronic device including a display and a processor functionally connected with the display may include displaying, through the display, at least one view object using a first view layer and a second view layer at least partially overlapped with the first view layer, obtaining a user input regarding the displayed view object, if a movement of the user input satisfies a first predetermined condition to be used for determining whether an input for the displayed view object is valid, process the user input by using the first view layer, and if the movement of the user input satisfies a second predetermined condition to be used for determining whether an input for the displayed view object is valid, process the user input by using the second view layer.

The method may further include providing a particular function selected from a first function corresponding to the first view layer and a second function corresponding to the second view layer in response to the user input.

Obtaining the user input may include obtaining the user input through a region overlapped with at least a part of the first view layer and at least of a part of the second view layer.

The method may further include the processor forming at least a part of a controller for controlling a touch panel in the electronic device.

The first predetermined condition may be set to correspond to the first view layer, and processing the user input by using the first view layer may include, if the movement of the user input satisfies the first predetermined condition, processing the user input on the first view layer.

The method may further include predetermining a plurality of conditions corresponding to the first view layer and defining a plurality of functions corresponding to the plurality of predetermined conditions.

The second predetermined condition may be set to correspond to the second view layer and processing the user input by using the second view layer may include, if the movement of the user input satisfies the second predetermined condition, processing the user input on the second view layer.

The method may further include predetermining a plurality of conditions corresponding to the second view layer and defining a plurality of functions corresponding to the plurality of predetermined conditions.

The first and second predetermined conditions may include at least one threshold in connection with at least one of a direction of the user input, a movement distance of the user input, and a touch pressure of the user input.

If the first view layer is an upper view layer with respect to the second view layer, the threshold of the first predetermined condition may be set to be smaller than the threshold of the second predetermined condition.

The method may further include, when the movement of the user input fails to exceed the threshold of the second predetermined condition, comparing the movement of the user input with the threshold of the first predetermined condition.

At least part of the electronic device (e.g., modules or functions thereof) or method (e.g., operations) according to an embodiment of the present disclosure may be implemented as commands stored in the form of program module, in a non-transitory computer-readable storage medium. In the case in which commands are executed by at least one processor, this processor may perform a particular function corresponding to the commands. The non-transitory computer-readable storage medium may be, for example, the memory. At least some of the program module may be implemented (e.g., executed) by, for example, the processor. At least some of the program module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices specially configured to store and perform a program instruction. In addition, the program instructions may include high level language codes, which may be executed in a computer by using an interpreter, as well as machine codes made by a compiler. The aforementioned hardware device may be configured to operate as one or more software modules in order to perform the operation of an embodiment of the present disclosure, and vice versa.

A module or programming module according to an embodiment of the present disclosure may include or exclude at least one of the above-discussed elements or further include any other element. The operations performed by the module, programming module or any other element may be executed sequentially, in parallel, repeatedly, or by a heuristic method. Additionally, some operations may be executed in different orders or omitted, or any other operation may be added.

While the present disclosure has been particularly shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory configured to store a first threshold of at least a first predetermined distance in a first X-axis direction or a first Y-axis direction and a second threshold of at least a second predetermined distance in a second X-axis direction or a second Y-axis direction;
a display; and
a processor functionally connected with the memory and the display, the processor configured to:
display a view group comprising one or more view objects using a first view layer and a second view layer, wherein the second view layer is a lower view layer than the first view layer and is at least partially overlapping the first view layer,
determine whether the first view layer or the second view layer of the view group is associated with a movement-related function,
wherein the movement-related function comprises at least one of a scroll, a flip, and an object move,
if neither the first view layer nor the second view layer of the view group is associated with the movement-related function, set the first threshold for both the first view layer and the second view layer of the view group, modifying the first threshold of the second view layer to be greater than the first threshold of the first view layer based on the second view layer being a lower view layer than the first view layer,
if at least one of the first view layer or the second view layer of the view group is associated with the movement-related function, set the second threshold for both the first view layer and the second view layer of the view group, modifying the second threshold of the second view layer to be greater than the second threshold of the first view layer based on the second view layer being a lower view layer than the first view layer,
obtain a user input regarding the one or more displayed view objects, the user input having at least one of an X-axis direction or a Y-axis direction,
if a movement of the user input satisfies the first threshold, identify the first view layer to be corresponding to the received user input, process the received user input using the identified first view layer, and perform a first function based on the processing, and
if the movement of the user input satisfies the second threshold, identify the second view layer to be corresponding to the received user input, process the received user input using the identified second view layer, and perform a second function based on the processing.

2. The electronic device of claim 1, wherein the processor is further configured to provide a function selected from a first function corresponding to the first view layer and a second function corresponding to the second view layer in response to the user input.

3. The electronic device of claim 1, wherein the processor is further configured to obtain the user input through a region overlapping at least a part of the first view layer and at least a part of the second view layer.

4. The electronic device of claim 1, further comprising:
a touch panel,
wherein the processor is further configured to form at least a part of a controller for controlling the touch panel.

5. The electronic device of claim 1, wherein a first predetermined condition and a second predetermined condition are set to correspond to the first view layer and the second view layer respectively, and wherein the processor is further configured to, if the movement of the user input satisfies the first and second predetermined conditions, process the user input on a specific view layer for which the satisfied conditions are set.

6. The electronic device of claim 5, wherein the processor is further configured to predetermine a plurality of conditions corresponding to the first and second view layers and define a plurality of functions corresponding to the plurality of predetermined conditions.

7. The electronic device of claim 1, wherein each of the first and second thresholds include at least one of a direction of the user input, a movement distance of the user input, and a touch pressure of the user input.

8. The electronic device of claim 1, wherein, if the first view layer is an upper view layer with respect to the second view layer, a threshold of a first predetermined condition is set to be smaller than a threshold of a second predetermined condition.

9. The electronic device of claim 8, wherein, when the movement of the user input fails to exceed the threshold of the second predetermined condition, the movement of the user input is compared with the threshold of the first predetermined condition.

10. A method for operating an electronic device including a display, a memory, and a processor functionally connected with the display and the memory, the method comprising:

storing, by the memory, a first threshold of at least a first predetermined distance in a first X-axis direction or a first Y-axis direction and a second threshold of at least a second predetermined distance in a second X-axis direction or a second Y-axis direction;

displaying, by the processor, a view group comprising at least one view object using a first view layer and a second view layer, wherein the second view layer is a lower view layer than the first view layer and is at least partially overlapping with the first view layer;

determine whether the first view layer or the second view layer of the view group is associated with a movement-related function, wherein the movement-related function comprises of at least one of a scroll, a flip, and an object move;

if neither the first view layer nor the second view layer of the view group is associated with the movement-related function, setting the first threshold for both the first view layer and the second view layer of the view group, and modifying the first threshold of the second view layer to be greater than the first threshold of the first view layer based on the second view layer being a lower view layer than the first view layer;

if at least one of the first view layer or the second view layer of the view group is associated with the movement-related function, setting the second threshold for both the first view layer and the second view layer of the view group, and modifying the second threshold of the second view layer to be greater than the second threshold of the first view layer based on the second view layer being a lower view layer than the first view layer;

obtaining, by the processor, a user input regarding the at least one display view object, the user input having at least one of an X-axis direction or a Y-axis direction;

if a movement of the user input satisfies the first, threshold, identifying the first view layer to be corresponding to the received user input, processing the received user input using the identified first view layer, and performing a first function based on the processing; and if the movement of the user input satisfies the second threshold, identifying the second view layer to be corresponding to the received user input, process the received user input using the identified second view layer, and perform a second function based on the processing.

11. The method of claim 10, further comprising:
providing, by the processor, a function selected from a first function corresponding to the first view layer and a second function corresponding to the second view layer in response to the user input.

12. The method of claim 10, wherein obtaining the user input includes obtaining the user input through a region overlapping with at least a part of the first view layer and at least of a part of the second view layer.

13. The method of claim 10, further comprising:
forming, by the processor, at least a part of a controller for controlling a touch panel further included in the electronic device.

14. The method of claim 10, wherein a first predetermined condition is set to correspond to the first view layer, and
wherein processing the user input by using the first view layer includes, if the movement of the user input satisfies the first predetermined condition, processing the user input on the first view layer.

15. The method of claim 14, further comprising:
predetermining, by the processor, a plurality of conditions corresponding to the first view layer and defining a plurality of functions corresponding to the plurality of predetermined conditions.

16. The method of claim 10, wherein a second predetermined condition is set to correspond to the second view layer, and
wherein processing the user input by using the second view layer includes, if the movement of the user input satisfies the second predetermined condition, processing the user input on the second view layer.

17. The method of claim 16, further comprising:
predetermining, by the processor, a plurality of conditions corresponding to the second view layer and defining a plurality of functions corresponding to the plurality of predetermined conditions.

18. The method of claim 10, wherein each of the first and second thresholds include at least one of a direction of the user input, a movement distance of the user input, and a touch pressure of the user input.

19. The method of claim 10, wherein if the first view layer is an upper view layer with respect to the second view layer, a threshold of a first predetermined condition is set to be smaller than a threshold of a second predetermined condition.

20. The method of claim 19, further comprising:
when the movement of the user input fails to exceed the threshold of the second predetermined condition, comparing the movement of the user input with the threshold of the first predetermined condition.

* * * * *